US 8,408,255 B1

(12) United States Patent
Wade et al.

(10) Patent No.: US 8,408,255 B1
(45) Date of Patent: Apr. 2, 2013

(54) BEVERAGE DISPENSING SYSTEM

(75) Inventors: Jeremy Wade, Bradenton, FL (US); Loren Ostema, Sarasota, FL (US); Ken Kemski, Sarasota, FL (US); Peter Dorney, Winter Springs, FL (US)

(73) Assignee: ValidFill, LLC, Sarasota, FL (US)

( * ) Notice: Subject to any disclaimer, the term of this patent is extended or adjusted under 35 U.S.C. 154(b) by 0 days.

(21) Appl. No.: 13/353,938

(22) Filed: Jan. 19, 2012

Related U.S. Application Data

(60) Division of application No. 12/474,561, filed on May 29, 2009, now Pat. No. 8,245,739, which is a continuation-in-part of application No. 10/971,486, filed on Oct. 22, 2004, now abandoned, and a continuation-in-part of application No. 10/922,470, filed on Aug. 20, 2004, now Pat. No. 7,617,850.

(Continued)

(51) Int. Cl.
*B65B 3/04* (2006.01)

(52) U.S. Cl. ............ 141/94; 141/86; 141/104; 141/235; 141/311 A; 141/351; 222/23; 222/129.1

(58) Field of Classification Search .............. 141/86–88, 141/94, 104, 235, 237, 351, 360, 311 A; 222/23, 222/129.1, 640
See application file for complete search history.

(56) References Cited

U.S. PATENT DOCUMENTS

| D38,248 S | 9/1906 | Helmer |
|---|---|---|
| D70,329 S | 6/1926 | Johnson |
| 2,899,098 A | 8/1959 | Gits |
| 3,017,215 A | 1/1962 | Galipeau |
| D195,376 S | 6/1963 | Curtis |
| D209,533 S | 12/1967 | Cole |
| D215,328 S | 9/1969 | Fera |
| D219,163 S | 11/1970 | Welsh |
| D219,529 S | 12/1970 | Uhrmann |
| D222,628 S | 11/1971 | Beckman |
| 3,684,120 A | 8/1972 | Beeman |
| 3,698,868 A | 10/1972 | Bilichniansky |
| D225,363 S | 12/1972 | Welsh |
| D246,882 S | 1/1978 | Thrush |
| 4,074,827 A | 2/1978 | Labe, III |
| D247,840 S | 5/1978 | Dixson |
| 4,151,923 A | 5/1979 | Bernardi |
| D265,880 S | 8/1982 | Craig |
| 4,469,250 A | 9/1984 | Evezich |
| D279,752 S | 7/1985 | Jagger |
| D282,232 S | 1/1986 | Bussell |
| D288,766 S | 3/1987 | Tardif |
| 4,770,519 A | 9/1988 | Jacques |
| D298,200 S | 10/1988 | Block et al. |
| D307,089 S | 4/1990 | Lage |
| 5,001,907 A | 3/1991 | LaCroix et al. |
| D323,620 S | 2/1992 | Patterson |
| D339,068 S | 9/1993 | Bell et al. |
| 5,280,844 A | 1/1994 | Kaufman et al. |
| 5,332,121 A | 7/1994 | Schmidt et al. |

(Continued)

FOREIGN PATENT DOCUMENTS

EP 0444990 A1 2/1991

*Primary Examiner* — Gregory Huson
*Assistant Examiner* — Nicolas A Arnett
(74) *Attorney, Agent, or Firm* — Buchanan Ingersoll & Rooney PC

(57) ABSTRACT

A beverage dispensing system comprising a dispensing port for dispensing a beverage, a drip tray located below the dispensing port for collecting the beverage dispensed and an antenna located between the dispensing port and the drip tray is provided. The beverage dispensing system is RFID-enabled by configuring the antenna to receive signals from radio frequency identification (RFID) tag.

5 Claims, 10 Drawing Sheets

Related U.S. Application Data

(60) Provisional application No. 60/518,904, filed on Nov. 10, 2003, provisional application No. 60/513,662, filed on Oct. 23, 2003.

(56) References Cited

U.S. PATENT DOCUMENTS

| | | |
|---|---|---|
| D350,672 S | 9/1994 | Egger et al. |
| D351,314 S | 10/1994 | Sokolski et al. |
| D367,206 S | 2/1996 | Green |
| 5,566,732 A | 10/1996 | Nelson |
| D377,738 S | 2/1997 | Thorne |
| D388,281 S | 12/1997 | Trombley |
| 5,711,452 A | 1/1998 | Chaffin |
| D406,985 S | 3/1999 | Trombly |
| D408,221 S | 4/1999 | Asberg |
| D412,120 S | 7/1999 | Payne et al. |
| D412,806 S | 8/1999 | Pierce |
| D433,876 S | 11/2000 | Freed |
| 6,152,862 A | 11/2000 | Hobbs |
| D436,802 S | 1/2001 | Kaposi et al. |
| D437,185 S | 2/2001 | Freed |
| D442,436 S | 5/2001 | Kleckauskas et al. |
| D444,349 S | 7/2001 | Lin |
| D451,346 S | 12/2001 | Wyche |
| 6,375,046 B1 | 4/2002 | Alleard et al. |
| D457,035 S | 5/2002 | Hurlbut |
| D457,396 S | 5/2002 | Janky et al. |
| D458,082 S | 6/2002 | Gluck |
| D462,575 S | 9/2002 | Gluck |
| D462,578 S | 9/2002 | Janky |
| 6,443,335 B1 | 9/2002 | Pinedjian et al. |
| D464,849 S | 10/2002 | Norris et al. |
| 6,460,739 B1 | 10/2002 | Norris et al. |
| D465,132 S | 11/2002 | Janky et al. |
| D466,371 S | 12/2002 | Parker |
| D467,122 S | 12/2002 | Janky |
| D467,124 S | 12/2002 | Janky |
| D468,588 S | 1/2003 | Norris et al. |
| D469,309 S | 1/2003 | Janky |
| D471,763 S | 3/2003 | Hurlbut et al. |
| D471,764 S | 3/2003 | Janky |
| D472,100 S | 3/2003 | Gullickson et al. |
| D472,101 S | 3/2003 | Janky |
| 6,527,137 B1 | 3/2003 | Kleckauskas et al. |
| D474,367 S | 5/2003 | Turchi et al. |
| D475,891 S | 6/2003 | Bin |
| D476,193 S | 6/2003 | Janky |
| D477,183 S | 7/2003 | Janky |
| D477,185 S | 7/2003 | Janky |
| D484,365 S | 12/2003 | Wyche |
| 6,684,920 B2 * | 2/2004 | Seitz et al. .................... 141/198 |
| 6,968,876 B2 | 11/2005 | Yacko et al. |
| 6,990,391 B1 * | 1/2006 | Cunha et al. .................. 700/237 |
| 7,127,236 B2 | 10/2006 | Khan et al. |
| 7,617,850 B1 | 11/2009 | Dorney |
| 7,845,375 B2 * | 12/2010 | Dorney .......................... 141/94 |
| 7,898,407 B2 * | 3/2011 | Hufton et al. ............. 340/539.11 |
| 8,087,303 B2 * | 1/2012 | Beavis ....................... 73/861.47 |
| 8,127,805 B2 * | 3/2012 | Dorney ......................... 141/104 |
| 8,151,832 B1 * | 4/2012 | Dorney .......................... 141/94 |
| 8,240,508 B2 * | 8/2012 | Wegelin et al. ................. 222/52 |
| 8,245,739 B1 * | 8/2012 | Wade et al. ..................... 141/94 |
| 8,261,780 B2 * | 9/2012 | Thomas et al. ................... 141/9 |
| 2002/0134831 A1 | 9/2002 | Saveliev et al. |
| 2003/0051767 A1 | 3/2003 | Coccaro et al. |
| 2004/0093281 A1 | 5/2004 | Silverstein et al. |
| 2004/0220824 A1 * | 11/2004 | Imai et al. ........................ 705/1 |
| 2005/0029287 A1 | 2/2005 | Mobbs |
| 2005/0087255 A1 | 4/2005 | Humphrey et al. |
| 2005/0140501 A1 | 6/2005 | Rizzo et al. |
| 2006/0219776 A1 | 10/2006 | Finn |
| 2007/0215239 A1 * | 9/2007 | Dorney .......................... 141/94 |
| 2009/0289796 A1 * | 11/2009 | Blumberg, Jr. ............. 340/572.1 |
| 2010/0125362 A1 * | 5/2010 | Canora et al. ................. 700/236 |
| 2010/0147417 A1 * | 6/2010 | Dorney .......................... 141/95 |
| 2010/0200110 A1 * | 8/2010 | Segiet et al. .................... 141/94 |

* cited by examiner

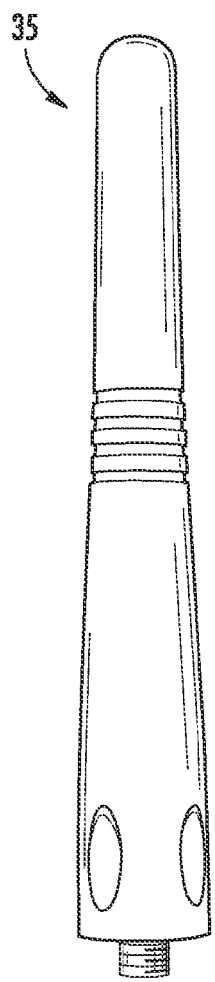
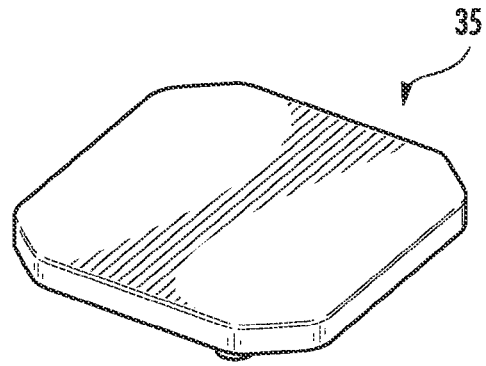
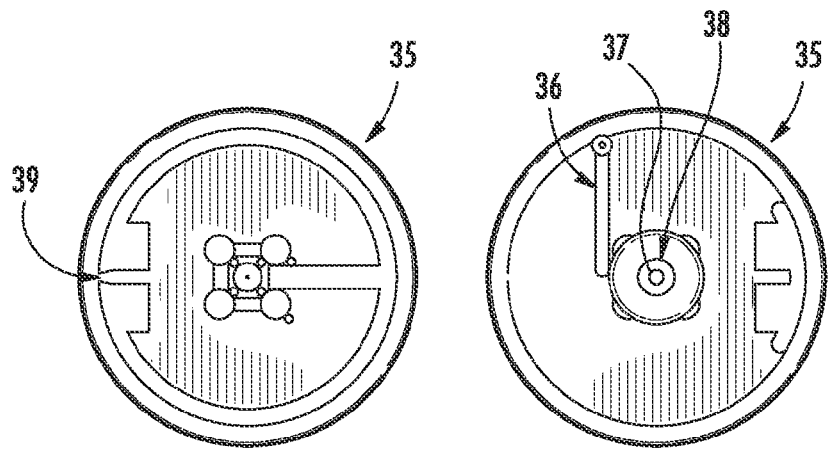
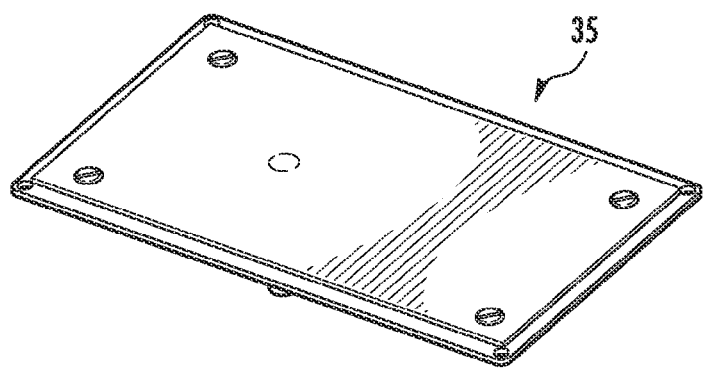
FIG. 2a  FIG. 2b  FIG. 2c  FIG. 2d  FIG. 2e

BEVERAGE DISPENSING SYSTEM

CROSS-REFERENCE TO RELATED APPLICATIONS

This application is a divisional of U.S. patent application Ser. No. 12/474,561, filed on May 29, 2009, which is a continuation-in-part of U.S. patent application Ser. No. 10/922,470, filed Aug. 20, 2004 and now U.S. Pat. No. 7,617,850, and a continuation-in-part of U.S. patent application Ser. No. 10/971,486, filed Oct. 22, 2004 and now abandoned, which is based on and claims priority to U.S. Provisional Patent Application No. 60/513,662, filed Oct. 23, 2003 and U.S. Provisional Patent Application No. 60/518,904, filed Nov. 10, 2003. Each of the foregoing applications is hereby expressly incorporated by reference in its entirety.

BRIEF DESCRIPTION OF THE DRAWINGS

In the accompanying drawings:

FIG. 2a illustrates a walkie-talkie antenna.

FIG. 2b illustrates a top perspective view of a circularly polarized antenna.

FIG. 2c illustrates a top view of a loop antenna.

FIG. 2d illustrates a bottom view of a loop antenna.

FIG. 2e illustrates a top perspective view of a patch antenna.

DETAILED DESCRIPTION

Figure 1:
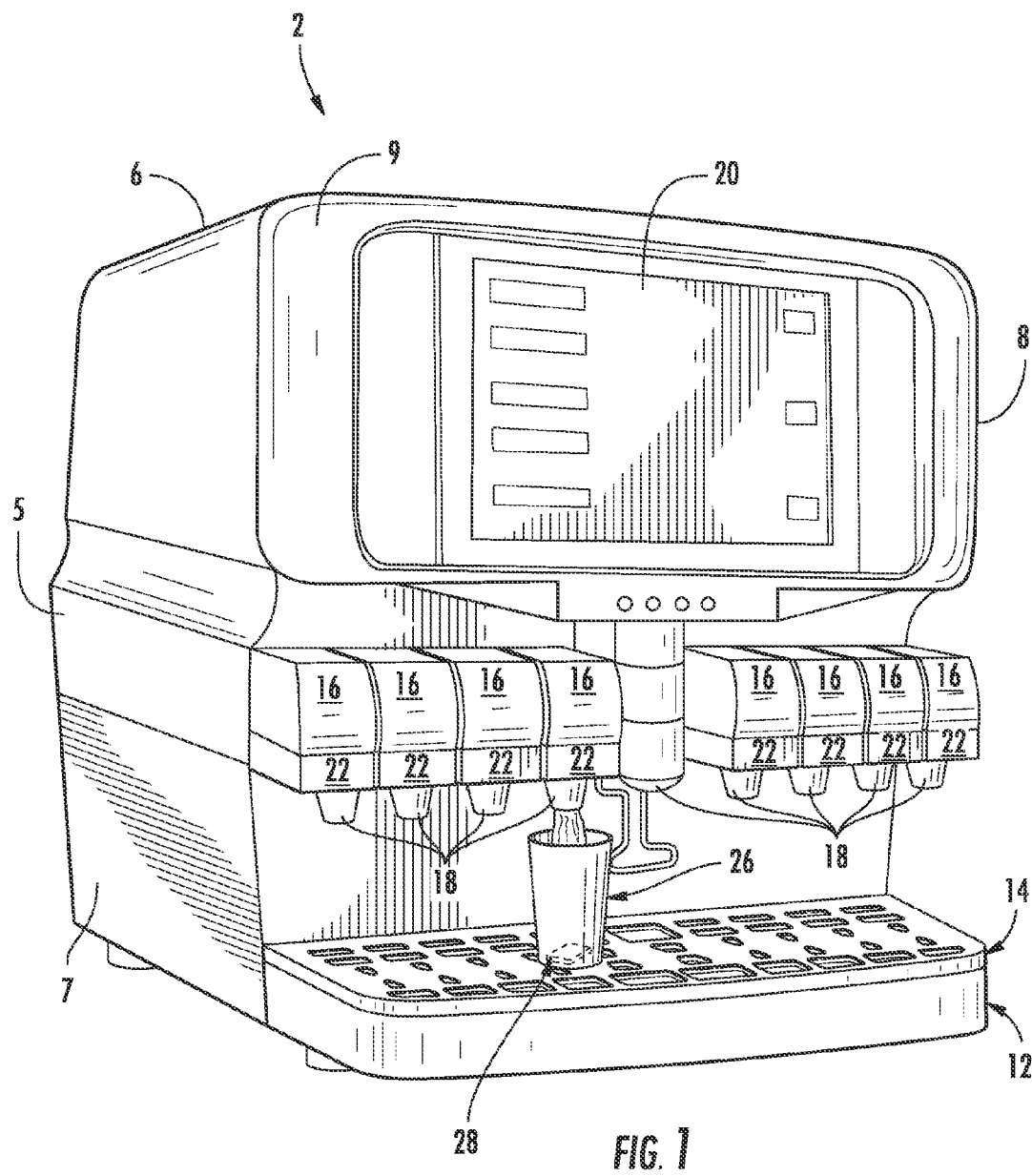
FIG. 1 illustrates a beverage dispensing system in accordance with a first embodiment.

Referring to FIG. 1, a beverage dispensing system 2 in accordance with a first embodiment is illustrated. The beverage dispensing system 2 includes a dispenser housing 5 having a top surface 6, side panels 7 and 8, front face 9 and a back surface (not shown). A dispensing head 16 has a dispensing port 18 and a user operated dispensing switch 22. A grate assembly 14 is placed onto a drip tray 12 of the beverage dispensing system 2. The drip tray 12 is used to collect the beverage dispensed through the dispensing port 18. The beverage and ice stored in the beverage dispensing system 2 is dispensed into a container 26 through the dispensing port 18, when a dispensing valve (not shown) associated with the corresponding dispensing head 16 is activated. As seen, a beverage dispensing system 2 has a plurality of such dispensing heads 16, each dispensing a same or a different beverage and one dispensing ice. The dispensing head 16, for dispensing the ice, may be located at the center, with the multiple dispensing heads 16, for the beverages, located on its either side. The shape of the central ice dispensing head 16 may be different than that of the beverage dispensing heads 16, located on its either side, as seen in FIG. 1. A display screen 20 is provided within the front face 9 of the dispenser housing 5 to display different messages, advertisements, instructions, tutorials, videos etc. for the user of the beverage dispensing system 2. The display screen 20 may be a LCD touch sensor screen. The display screen 20 may include a touch screen sensor keyboard through which a customer may input information. The beverage dispensing system 2 may be a fountain dispensing machine or any other similar dispensing machine.

It should be understood that the basic components of the beverage dispensing system 2 are not limited by this description. For example, the display screen 20 may be positioned above the housing 5 rather than within the front face 9 of the housing 5. The beverage dispensing system 2 may or may not employ a graphical user interface (GUI.) In effect, the beverage dispensing system 2 may or may not have a display screen 20. The dispensing switch 22 may be a lever, a push button or any other similar type of switch known in the art. The beverage dispensing system 2 may be a fountain dispenser for any type of beverages, hot or cold. As such, the beverage dispensing system 2 may dispense a variety of carbonated and non-carbonated beverages such as soda, iced tea, juices, performance drinks, and the like. Further, the shape and size of the dispenser housing 5 may vary according to the needs of the establishment where the beverage dispensing system 2 is to be installed and operated.

The beverage dispensing system 2 is equipped with a RFID hardware, which includes a RFID tag 28, a RFID reader 53 (illustrated in FIG. 8) and an antenna 35. Different types of antenna, which allow transfer of information between the RFID tag 28 and the RFID reader 53, are illustrated in FIG. 2a-2e. FIG. 2a illustrates a walkie-talkie antenna. The walkie-talkie antenna may be approximately 2"-3" long, though it may have different length. FIG. 2b illustrates a top perspective view of a circularly polarized antenna. The antenna 35, which is a circularly polarized antenna, may have varying dimensions. FIG. 2c is a top view of a loop antenna. FIG. 2d illustrates a bottom view of the loop antenna 35 having a gamma match 36 and adapted for attachment to a coaxial Subminiature Version 'A' (SMA) cable, via a SMA connector 38, although connectors like TNC (Threaded Neill-Concelman), BNC (Bayonet Neill-Concelman) or any other similar connectors known in the art may be used. The gamma match 36 is used to tune the frequency of the antenna 35. Antenna 35 used may have different gamma matches in order to allow attachment of the SMA Cable in various orientations. The loop antenna 35 is a 1.55" OD loop and has a metal ring that defines a capacitive gap 39 formed at a location opposite to the attachment point of the SMA Cable 37. FIG. 2e illustrates a top perspective view of a patch antenna. The length of the patch antenna used is dependent on the wave length with varying degrees of height. Hence, patch antenna of varying dimensions may be used. The antenna 35 may be a high frequency (HF) antenna or an ultra high frequency (UHF) antenna having a vertical read field and operating in a magnetic field with a maximum near-h-field performance. The loop antenna 35 may be a segmented loop antenna. The type and dimension of the antenna 35 may be varied depending on the requirement and design of beverage dispensing system 2.

The beverage dispensing system 2 is adapted to communicate with the RFID tag 28. The programmable RFID tag 28 may be a read only tag, a WORM (write once, read many) tag or a read/write tag. As is known in the art, read only RFID tags contain unique information that cannot be changed, WORM tags may be written to once and then locked in to a read state whereas read/write tags allow for unlimited reading/writing and transfer of information to the tag. The RFID tag may also be electronic article surveillance (EAS) tag. The RFID tag may be a high frequency (HF) tag, an ultra high frequency (UHF) tag, an active tag or a passive tag. Any suitable RFID tag 28, which has near-field properties, reads well through fingers and hands, has minimal sensitivity to liquids and does not have any preferred orientation with respect to the antenna 35, may be used. For example, the SIT tag, the Short Dipole Tag and the AD805 near field tag, the Button and Paperclip tag, commercially available from Alien, Avery Dennison and Impinj, respectively, may be used. RFID tag 28 includes a chip set and an antenna. The chip-set of the RFID tag 28 has a memory for storing data and a processor for performing functions on the stored data. The chip-set of the RFID tag 28 is designed around a 96-bit architecture, although it may be varied to suit the available software packages and the source code.

The RFID tag 28 is adapted to store information relating to at least one of the purchase date and the time, the size (ounce capacity) of the cup, the type of the cup, the company name and location, the amount of beverage being purchased, the promotional code that states unlimited refills, the syrup ratio, the number of days and the number of refills or the number of pours per day (such as 5 days or 1 hour). The RFID tag 28 may also store information which includes name, point of initial or last sale, initial or last location field, etc. Each RFID tag 28 and hence the corresponding container 26 has a unique identification number. RFID tag 28 used, may also be manufactured with a pre-set unique tag ID.

The container 26 may be a cup, a can, a bottle, a bowl, a bucket or any other similar vessel, which can be used to hold the dispensed beverage. The container 26 may be of any material, such as glass, plastic, paper, cardboard and the like. The container 26 may be refillable or disposable, and adapted to hold hot and/or cold beverages. The RFID tag 28 may take the form of a thin flexible label, ticket, chip or card that may be affixed to an object, such as the container 26. The container 26 may have a generally cylindrical configuration with an inner and an outer wall defining an intermediate air space there between. The RFID tag 28 may be embedded between the inner and the outer walls of the container 26. The RFID tag 28 may also be attached to the inner or outer surface of the container 26 by an adhesive, fastener or inlay molded into the plastic when the container 26 is manufactured. The RFID tag 28 may also be directly molded into the container 26. The RFID tag 28 may be attached to the lip or lid of the container 26. The RFID tag 28 may be positioned anywhere in the container 26; at the bottom, in the side walls, at the top, etc. Those skilled in the art recognize that there are various techniques for coupling the RFID tag 28 to the container 26 and that the tag may be positioned anywhere in the container 26, as per the design and configuration of the beverage dispensing system 2. Optionally, the RFID tag 28 may be provided in an access card, a key tag or a separate device which the customer may swipe before the beverage is dispensed into a non-tagged container.

Figure 3:
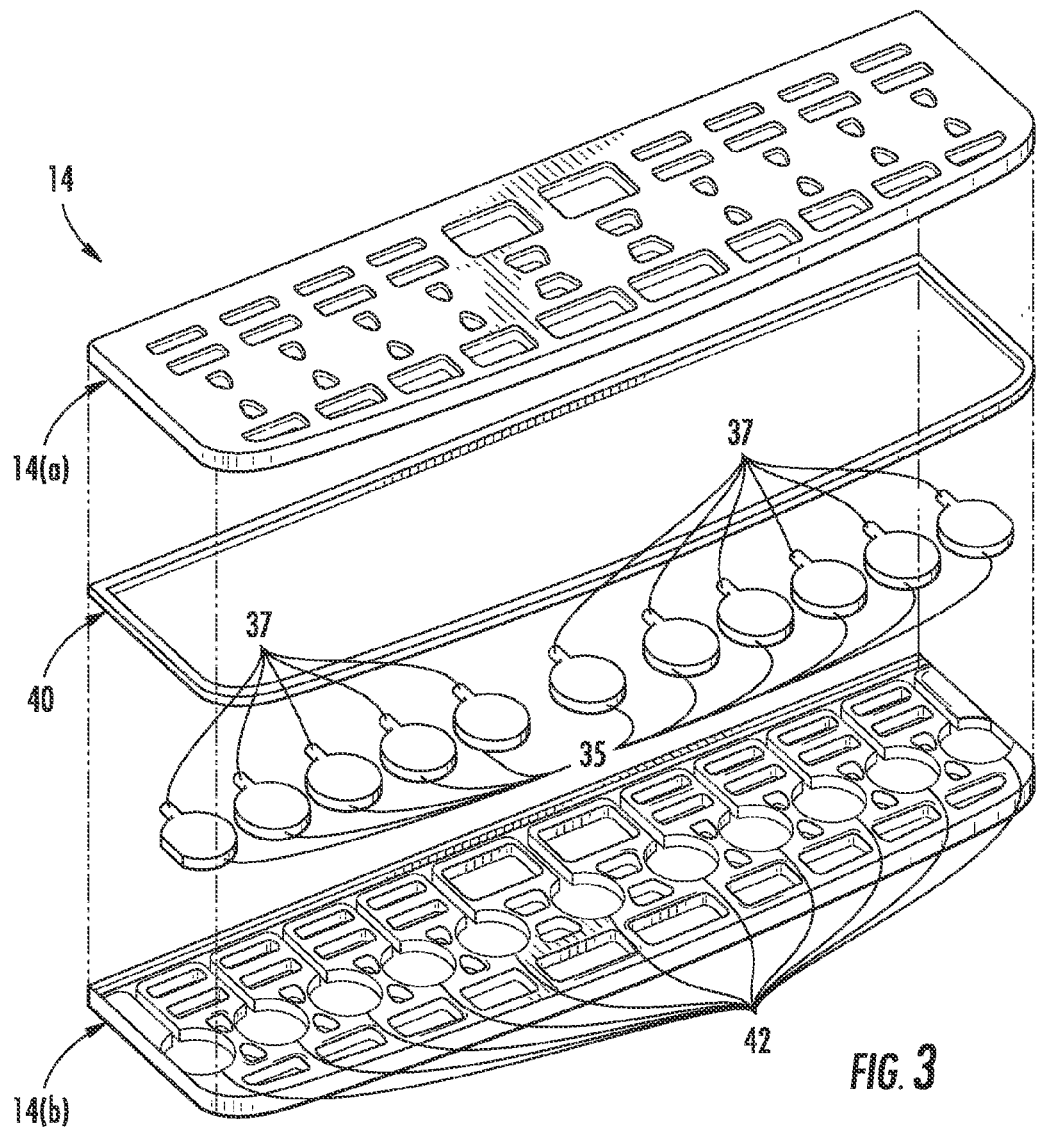
FIG. 3 is an exploded view of the grate assembly in accordance with a first embodiment.

FIG. 3 illustrates an exploded view of the grate assembly 14 of the beverage dispensing system 2. The grate assembly 14 comprises an upper half portion 14 (a) and a lower half portion 14 (b), which are attached together by screws, rivets, adhesives or any other similar techniques known in the art. The interface between the upper half portion 14 (a) and the lower half portion 14 (b) is sealed with a gasket 40, which prevents liquids from infiltrating the area of the antenna 35. One antenna 35 is provided for each dispensing head 16. The beverage dispensing system 2 may have any number of dispensing heads 16, as per the configuration of the beverage dispensing system 2. As seen in FIG. 3, each of the antennas 35 is integrated within a circular compartment 42 between the upper half portion 14 (a) and the lower half portion 14 (b) of the grate assembly 14. At each circular compartment 42 an antenna 35 is located, which is associated with the corresponding dispensing head 16. The antenna 35 may be integrated within any other suitable compartment.

Figure 4:
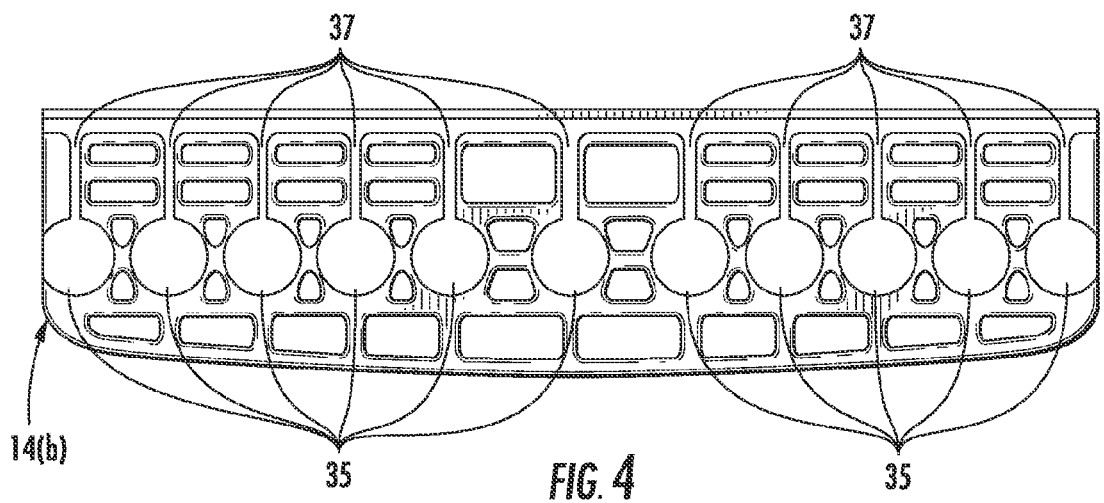
FIG. 4 is a top view of the lower half of the grate assembly in accordance with a first embodiment.

As illustrated in the top view of the lower half portion 14 (b) of the grate assembly 14, in FIG. 4, is a beverage dispensing system 2 having eleven dispensing heads. Eleven antennas 35 are embedded in series within the eleven circular compartments 42 of the grate assembly 14. One antenna corresponds to each of the beverage dispensing head 16 and one antenna corresponds to the ice dispensing head 16. As such, a series of eleven antennas 35 are integrated within the grate assembly 14. The ten dispensing heads may be used to dispense different or same beverages and one dispensing head is used to dispense the ice. Any number of antennas 35 may be integrated within the grate assembly 14 depending on the active number of dispensing heads 16, which are present on the beverage dispensing system 2. An air space of approximately 0.0625 inches exists between the metal ring of the antenna 35 and the drip tray 12, in order to minimize the detuning effects in the environment. Placing of the antenna 35 within the grate assembly 14 eliminates contact of antenna 35 with the beverage or ice being dispensed. The SMA Cable 37 is attached to each of the antenna 35, and the free end of each such cable exits the grate assembly 14 for further connections. The grate assembly 14 may have grooves to help remove the accumulation of liquid.

Figure 5:
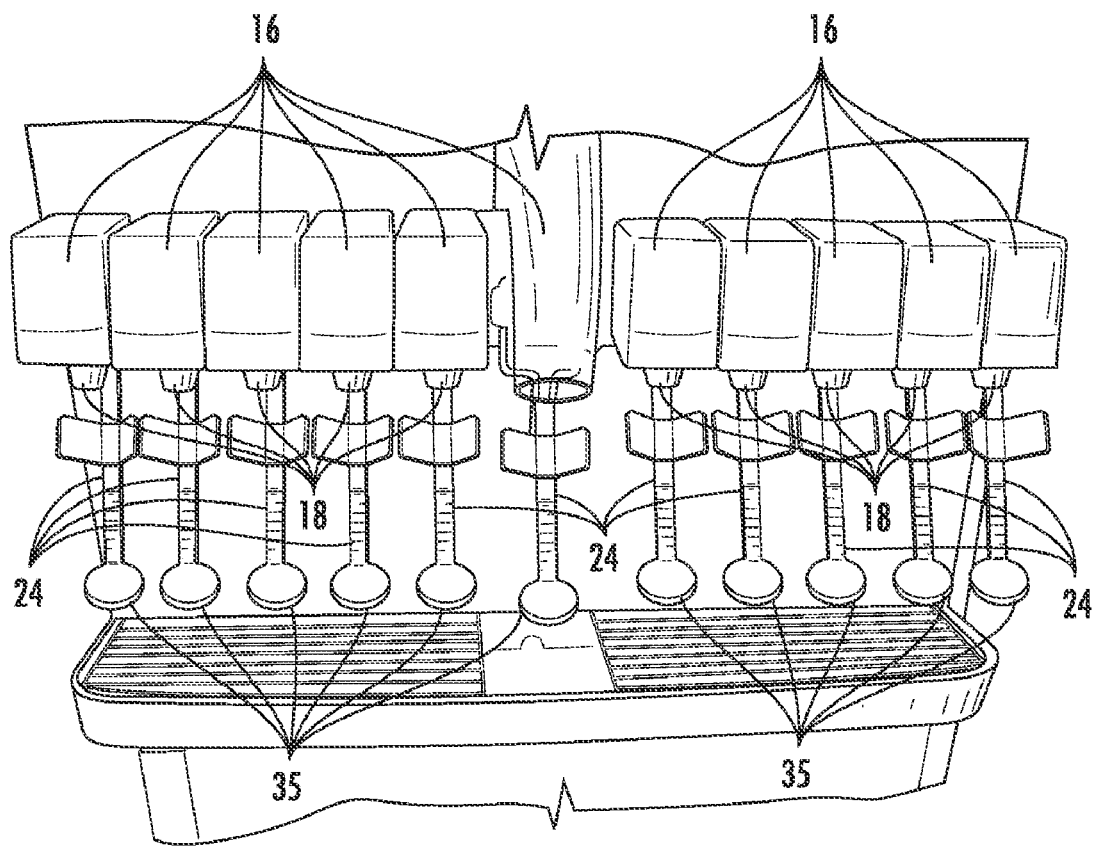
FIG. 5 illustrates a beverage dispensing system in accordance with a second embodiment.

In accordance with a second embodiment, the dispensing switch 22 of the above embodiment is replaced by a lever 24 and the antenna 35 is integrated onto the lever 24, as illustrated in FIG. 5. A lever 24 is provided for each of the dispensing heads 16 of the beverage dispensing system 2. An antenna 35 is mounted on each of the lever 24. As seen, eleven antennas are integrated onto the eleven levers of the beverage dispensing system 2; ten antennas corresponding to the ten dispensing heads, which may dispense different beverages and one central antenna corresponding to the dispensing head, which dispenses ice. When the antenna 35 is placed on the lever 24, the antenna 35 is within the field of the RFID tag 28, even if the user holds the container 26 rather than placing the container 26 on the grate assembly 14. Thus, placing of the antenna 35 on the lever 24 allows users to fill their drink while holding the container 26. The grate assembly 14 of the above embodiment may or may not be used. In an alternate embodiment, along with the lever 24, the dispensing switch 22 of the dispensing head 16 may also be present.

Figure 6:
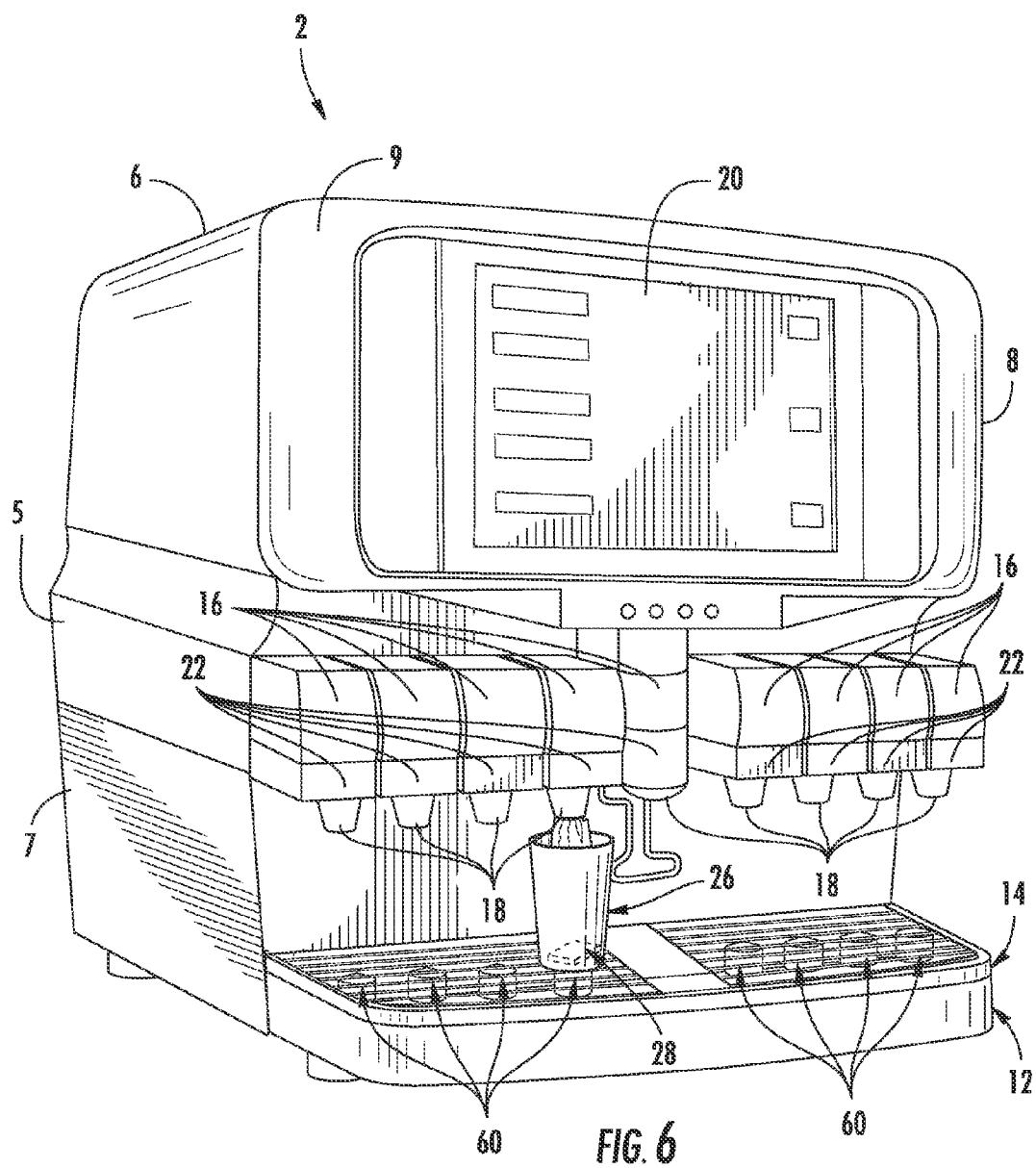
FIG. 6 illustrates a beverage dispensing system in accordance with a third embodiment.
Figure 7:
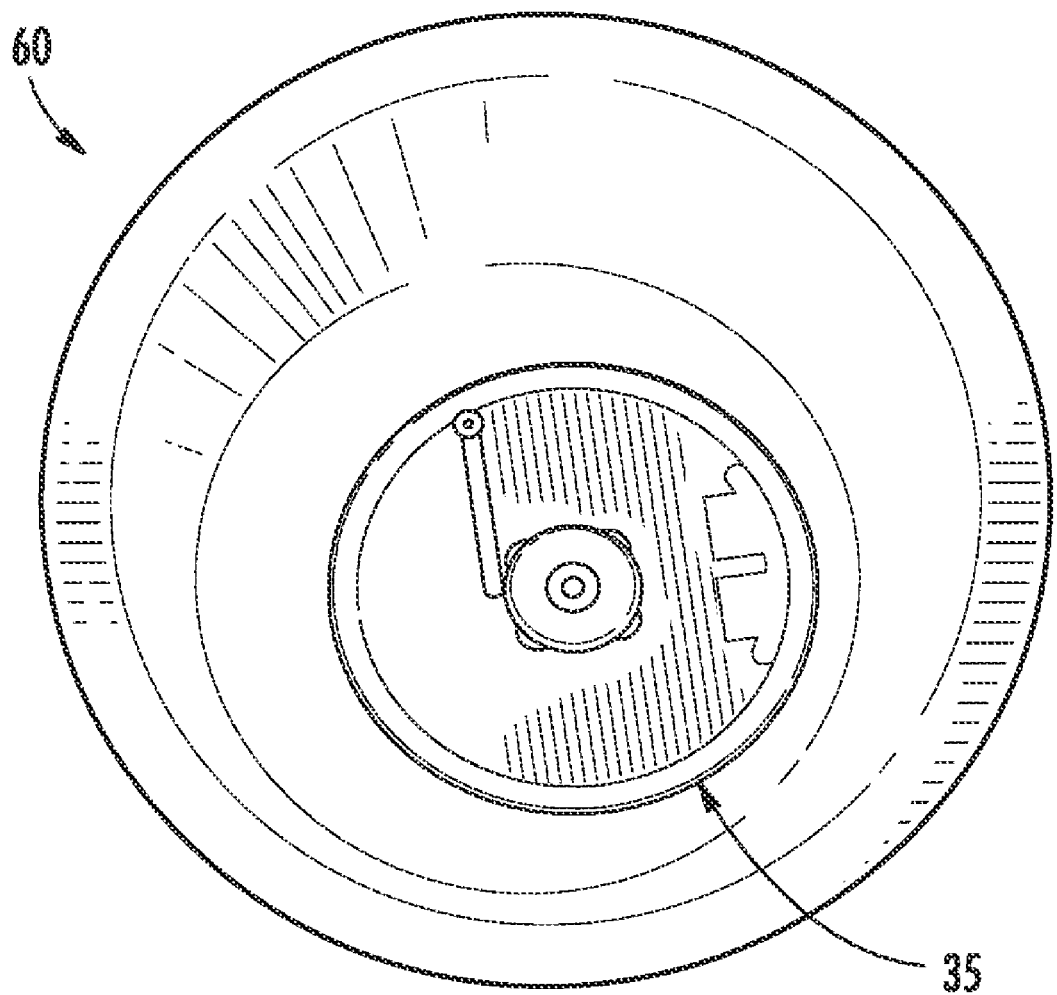
FIG. 7 illustrates antenna housing in accordance with a third embodiment.

In accordance with a third embodiment, as illustrated in FIG. 6, the antenna 35 is integrated inside the drip tray 12 of beverage dispensing system 2. The antenna 35 is placed inside a channel defining the drip tray 12. As such, the antenna 35 is spaced from the bottom surface of the drip tray 12. As illustrated in FIG. 7, an antenna housing 60 is provided for each of the antenna 35, within the drip tray 12. Antenna housing 60 for each of the antenna 35 extends upwards from the bottom surface of the drip tray 12. The antenna housing 16 is a cylindrically raised area with a rounded top such that the beverage striking the outer upper surface of the antenna housing 60 flows off the surface via gravity, thus, preventing the contact of the antenna 35 with the beverage. The antenna housing 60 may be made of plastic or any other suitable material. Nine antennas are integrated within the drip tray 12; eight for the beverage dispensing heads and one for the ice dispensing head. As the antenna 35 is placed inside the antenna housing 60 in the drip tray 12, the antenna 35 does not come in any direct contact with the container 26. The grate assembly 14, made of a non-ferrous material, is located between the antenna housing 60 and the dispensing port 18. The antenna 35 may also be housed within an antenna housing 60 that is located on top of the drip tray 12. Optionally, the grate assembly 14 may not be used. Also, the antenna housing 60 may include an indicator light which is green when an RFID tag 28 is in communication with the antenna 35 and red when no RFID tag is detected within the reading field of the antenna 35.

Figure 8:
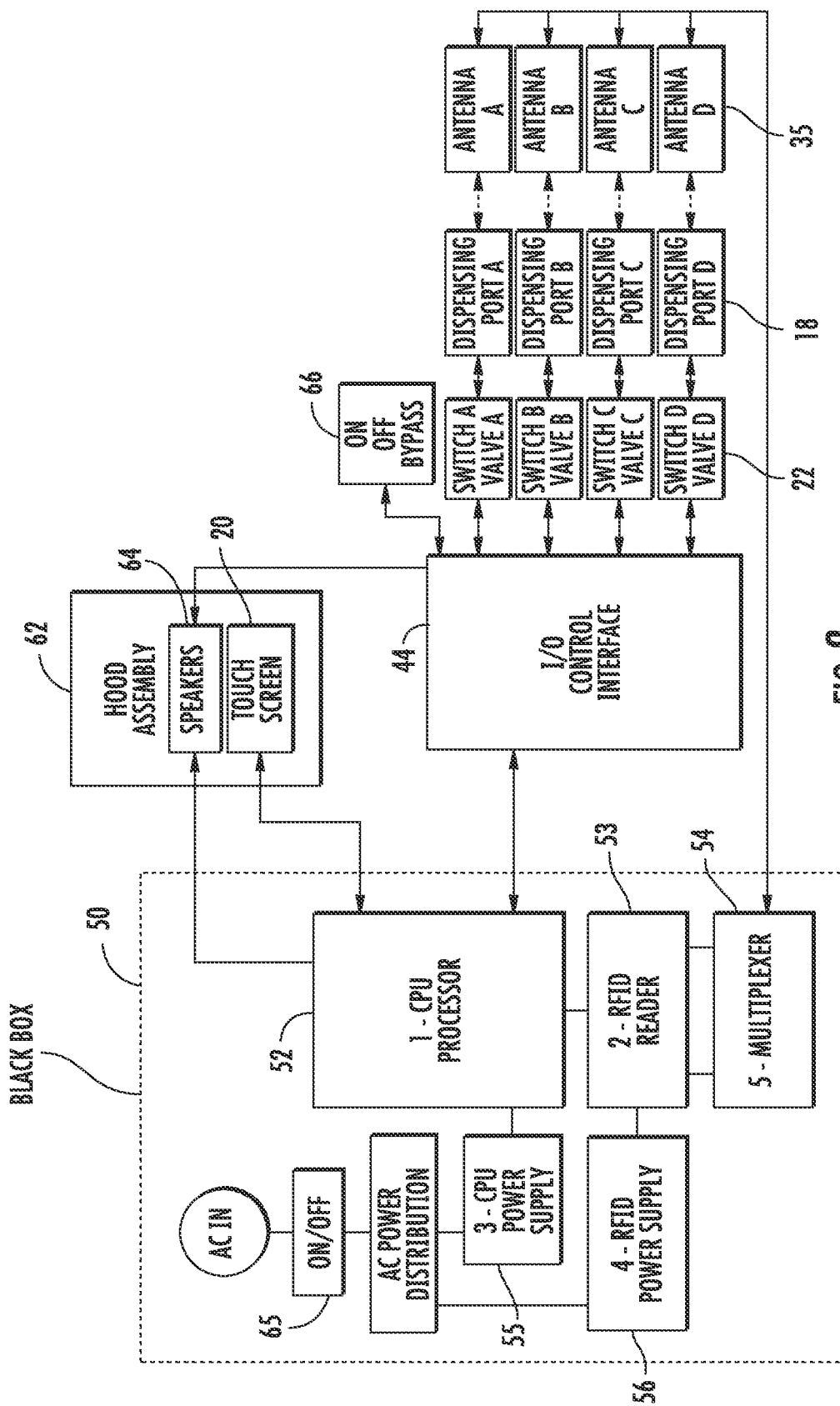
FIG. 8 is a block diagram of the circuitry employed in the beverage dispensing system.

FIG. 8 is a block diagram of the circuitry employed in the beverage dispensing system 2. As shown, the circuitry includes an I/O control interface 44, a processing system 50, a hood assembly 62 and an On/Off by pass switch 66. The processing system 50 may be housed within a housing (not shown) mounted on the side panels 7 and 8, the top surface 6, or the back surface of the beverage dispensing system 2. It may also be mounted in any other convenient position on the dispenser housing 5. The processing system 50 includes a CPU 52, a RFID reader 53, a multiplexer 54, a power supply 55 for the CPU 52 and a power supply 56 for the RFID reader 53. The processing system 50 is designed such that it may be retrofit into different brands of existing and future fountain dispensing machines to make them RFID enabled. The hood assembly 62 includes the display screen 20 and speakers 64. The hood assembly 62 encloses the I/O control interface 44 on the back surface of the beverage dispensing machine 2. The hood assembly 62 may be made of plastic. The hood assembly 62 may be a retrofit for modifying an existing manufacturer's hood hoods as to include, a touch screen monitor with power supply, speaker and cables. The hood assembly 62 may also be made from mild steel, polymer sheet, fiber glass or other suitable material.

Power is provided to the processing system 50 via a 110/220 volt AC-in line. An indicator light may be associated with the processing system 50 to indicate that the system is connected to 110/220 volt AC power. An On-Off key 65 may be provided to switch off the incoming AC power. The 110/220 volt-AC in-line is fed to the power supply 55 and the power supply 56. The power supply 55 converts the 110/220 volt AC to 12 volts to supply power required for the CPU 52 of the processing system 50. This 12 volt supply may then be connected to another voltage transforming device like a power supply on the CPU 52, which provides a variety of voltages for various uses. The power supply 56 provides power required for operating the RFID reader 53. A single power supply may also be used to power both the CPU 52 and the RFID reader 53.

The CPU 52 is a mini motherboard having an on-board processor, volatile RAM memory, as well as on-board video and sound processing components. The CPU 52 is connected by a LAN (local area network) cable to the RFID reader 53 to allow remote access, although other structure for connecting these components known in the art may be used. Long term memory may be provided via a hard disk drive, a solid state drive, a SD card or other devices. At least 10 Gigabytes of memory may be provided by the storage device. The CPU 52 may run Windows XP, POS Ready, Linux, Mac or other operating systems. Software for the graphical user interface (GUI) that allows videos to be programmed for the display screen 20 and log data from the beverage dispensing system 2 may reside in the hard disk memory of the CPU 52.

RFID reader 53 is the hardware that determines what information is being sent/received between the CPU 52 and the RFID tag 28. The antenna 35 emits a signal for activating the RFID tag 28 of the container 26 for reading and writing the data. The transmission of the radio frequency signals between the antenna 35, the RFID reader 53 and the RFID tag 28 take place in a magnetic field. RFID reader 53 decodes the data encoded in the RFID tag 28. The RFID reader 53 has its own firmware which performs the function of reading from and writing to the RFID tag 28. The data is then passed onto the CPU 52; the CPU 52 processes the received data and sends signals to the I/O control interface 44, accordingly. The RFID reader 53 and the antenna 35 are operatively coupled with the RFID tag 26 and the CPU 52 for communication.

The RFID reader 53 employs masking and RSSI (Received Signal Strength Indication) to ensure accuracy in the reading and writing of the RFID tag 28. In masking, the RFID reader 53 directs the RFID tag 28 to read/write its data only if it has a matching tag ID number, otherwise it disregards the command. This ensures that the right tag is written to, if more than one tag is present in the field. In RSSI, the RFID reader 53 compares the different signal strengths received. The strongest signal strength corresponds to the RFID tag 28 closet to the antenna 35. Accordingly, the RFID reader 53 communicates with the correct RFID tag 28 instead of the other tags in the field. This prevents writing to the wrong tag, when multiple tags are detected in the field.

When a plurality of antennas 35 are present, the multiplexer 54 controls which antenna 35 the RF signals are being sent to and received from. The multiplexer 54 is connected to the input-output port of the RFID reader 53 by a PS2 cable or DB9 cable and to the antenna port by a coaxial SMA Cable 37, although other structure for connecting these components known in the art may be used. SMA Cable 37 of the antenna 35, which is connected to the multiplexer 54 of the processing system 50, is used to control the antenna 35. The multiplexer 54 switches between antennas upon commands received from the RFID reader 53. When the antenna 35 is placed inside the drip tray 12 (as described in the third embodiment), the multiplexer 54 may as well be located in the drip tray 12, which avoids the need of long SMA cables 37; thus eliminating any possible impact such length has on the reading of the RFID tag 28. Thus, the multiplexer 54 may be located inside a separate housing (not shown), in the drip tray 12, or in any other suitable location. A splitter or any other similar device may also be used in place of the multiplexer 54. For a RFID reader, which has the number of antenna ports equal to or less than the total number of dispensing heads on the beverage dispensing system 2, each of the antennas may be directly connected to the RFID reader, without the need of the multiplexer 54. Thus, in an alternate embodiment, the multiplexer 54 may be eliminated.

Figure 9:
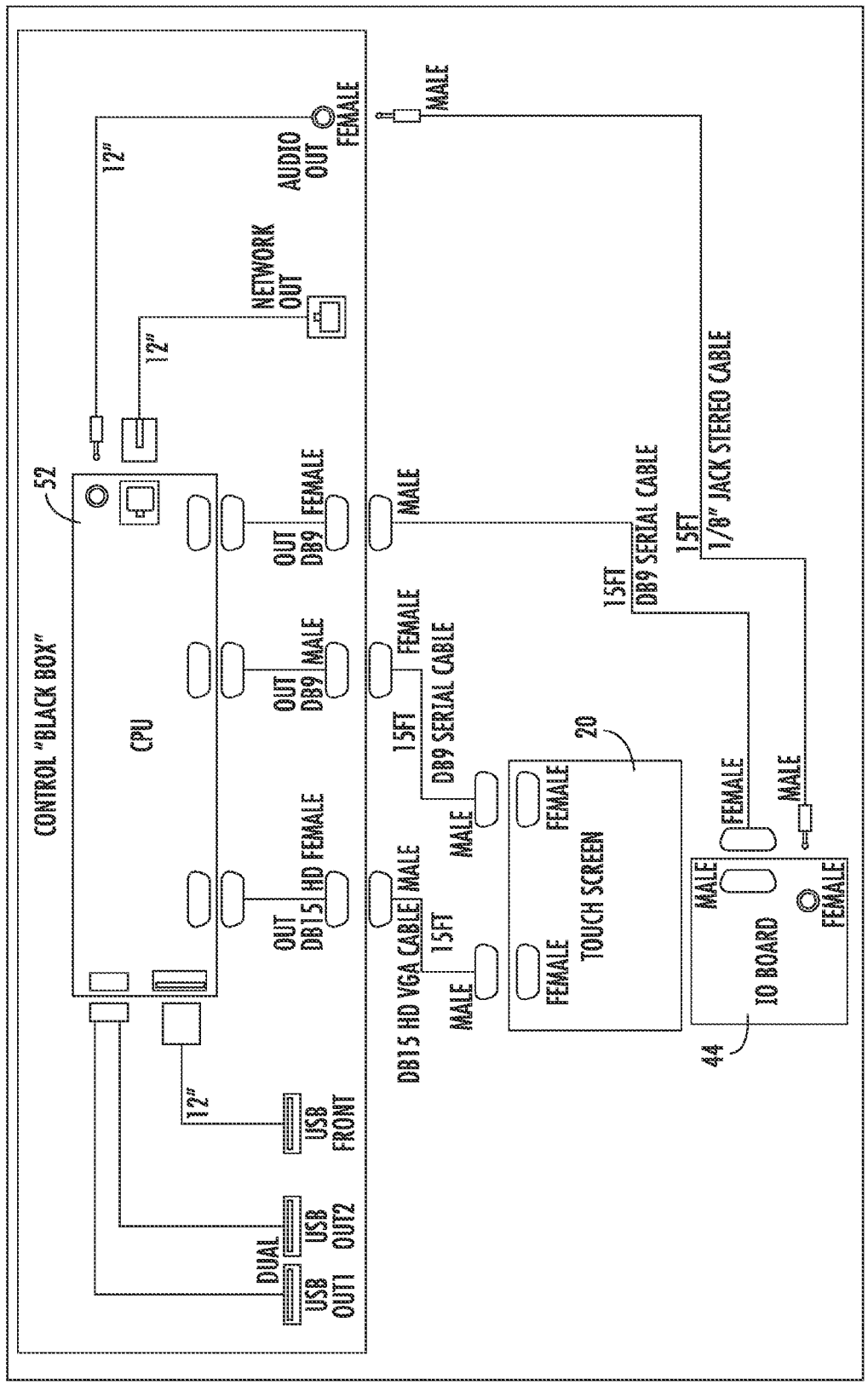
FIG. 9 illustrates a connection layout of the CPU with a display screen and an I/O control interface.

FIG. 9 illustrates the connection layout of the CPU 52 with the display screen 20 and the I/O control interface 44. The display screen 20 is connected to the CPU 52 of the processing system 50 by a VGA cable. The speakers 64 are connected to the CPU 52 and the I/O control interface 44 by a sound cable or a serial cable, although other structure known in the art may also be used. The I/O control interface 44 is provided with two RS 232 serial ports. One of the ports is used to connect the I/O control interface 44 to the CPU 52 of the processing system 50. In an alternate embodiment, where the beverage dispensing system 2 may not run graphics, one of the RS 232 port is connected to the RFID reader 53.

Figure 10:
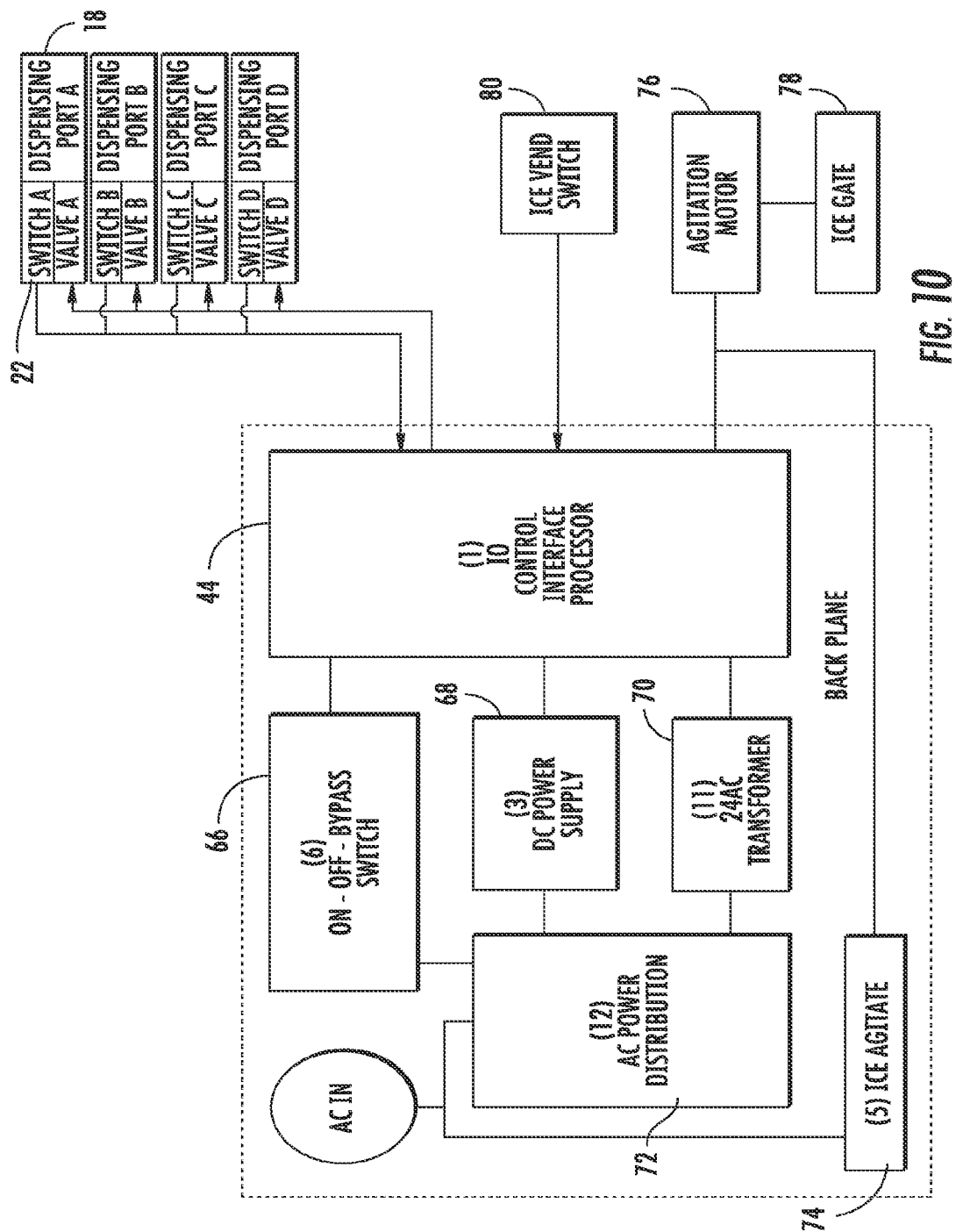
FIG. 10 illustrates a back plane circuitry employed in the beverage dispensing system.

FIG. 10 illustrates the back plane circuitry mounted on the back surface of the beverage dispensing system 2. The back plane circuitry includes the I/O control interface 44, the On-Off by-pass switch 66, a DC power supply 68, an AC transformer 70, an AC power distribution board 72, a starter capacitor and a bridge rectifier (not shown), an ice agitate board 74, an agitation motor 76, an ice gate 78 and an ice vend switch 80. The user selectable On-Off by pass switch 66 allows the entire processing system 50 to be turned on and off. When the On-Off by pass switch 66 is turned on, the processing system 50 is included with the circuit and the beverage dispensing system 2 is RFID-enabled. When no RFID container 26 is available and the beverage dispensing system 2 needs to be operated like a standard dispensing machine (non-RFID), the On-Off by pass switch 66 is turned off. Moving the switch to the bypass mode sends an input to the I/O control interface 44 that directs the I/O control interface 44 to bypass the processing system 50. This disables the RFID feature of the beverage dispensing system 2 and the beverage dispensing system 2 operates in a standard non-RFID mode.

The AC power distribution board 72 distributes the incoming 110/220 volt AC power to the DC power supply 68, the AC transformer 70, the display screen 20 of the hood assembly 62 and the On-Off by pass switch 66. From the incoming 110/220 volt AC power provided by the AC power distribution board 72, the DC power supply 68 provides a 12 volt DC power required to run the I/O control interface 44. The AC transformer 70 is a 24 volt AC transformer and provides a 24 volt AC power to each of the dispensing head 16 to operate the corresponding dispensing valve of the dispensing port 18. The ice in the beverage dispensing system 2 should be periodically agitated to keep it from freezing into a block. The ice agitate board 74 includes a relay, which periodically triggers the agitation motor 76 in order to agitate the ice. When the beverage dispensing system 2 is not in use, the ice agitate board 74 is permitted to agitate the ice on its own cycle. When the beverage dispensing system 2 is in use, the ice agitation operation is suspended by the I/O control interface 44 so that the agitation motor 76 and the ice vend switch 80 can be used for dispensing the ice.

As mentioned above, I/O control interface 44 controls the signals that open and close each of the dispensing ports 18 for dispensing the beverage and the ice. The I/O control interface 44 includes a processor with preprogrammed firmware, which consists of instructions for processing the data received from the CPU 52 and the input received from the dispensing switch 22. The I/O control interface 44 is provided with over 3 KB of RAM memory that can be used to buffer commands between the I/O control interface 44 and the CPU 52 of the processing system 50. Optionally, this RAM memory may be used to store the data of the RFID tag 28. The I/O control interface 44 is provided with up to 128 KB of ROM. The processor of the I/O control interface 44 may support the addition of solid-state, non-volatile memory to store the RFID tag data. This may eliminate the need of the CPU 52 of the processing system 50.

When the dispensing switch 22 on the dispensing head 16 is activated by a user, the I/O control interface 44 signals to CPU 52, which dispensing switch has been activated of the plurality of the dispensing switches 22. The CPU 52 then directs the RFID reader 53 to activate the antenna 35 corresponding to the selected dispensing head 16 and read the RFID tag 28 of the container 26, which is placed under that selected dispensing head 16. When the RFID tag 26 is detected by the antenna 35, the RFID reader 53 reads the data from the corresponding RFID tag 28; the RFID reader 53 reads the data from the RFID tag 28 only after the dispensing switch 22 has been activated, so that only the RFID tag corresponding to the selected dispensing head will be read, instead of any random tags that happen to be within the field of the RFID reader 53. After receiving the tag data from the RFID reader 53, the CPU 52 calculates the amount of time that the dispensing head 16 can be activated in order to dispense the amount of beverage, which the container 26 is authorized to receive. The CPU 52 then sends this calculated time to the I/O control interface 44 and the I/O control interface 44 activates (opens) the corresponding dispensing port 18 of the dispensing head 16 for the calculated amount of time. When the dispensing port 18 is released the corresponding beverage is dispensed into the container 26 for the calculated amount of time. The dispensing port 18, which dispenses the ice, may also be set to open up for a predetermined amount of time. Upon a signal from the CPU 52 to the I/O control interface 44, the dispensing port 18 that dispenses the ice, opens up for a preset amount of time to dispense a specific amount of ice. If the user needs more ice than is dispensed during one timing cycle, the user may hit the corresponding dispensing switch 22 multiple times depending upon the amount of ice he/she requires.

Each time flow out of the dispensing head 16 is stopped; the I/O control interface 44 relays back the information to the CPU 52. Thus, the total time and the amount of the beverage dispensed can be tracked. The CPU 52 tracks the time between refills and keeps the serial number of the container 26 in queue for a time set by the customer/user. During that time, beverage can be dispensed into the container 26 without incurring a charge for the additional refill. After the time has expired and the container serial number has been removed from the queue, a subsequent activation of the dispensing head 16 will incur a charge for another refill. The beverage dispensing system 2 may dispense multiple fills simultaneously. Hence, multiple antennas 35 and their corresponding dispensing heads 16 may be activated at the same time. An optical isolator may be used to convert the electrical signals into an isolated logic level signal for the processor of the I/O control interface 44, so as to process the signals going from the I/O control interface 44 to the dispensing head 16. These isolators prevent the electrical noise ad spikes, electrical shocks to the user, and protect the I/O control interface 44 and the CPU 52 from static electricity and electrical surges.

The software package of the beverage dispensing system 2, which may be used for various makes and models of the beverage dispensing systems, includes main system logic and a user interface system. The main system logic includes the RFID firmware, the firmware of the I/O control interface 44, container-handling logic and tag criteria logic. The main system logic may utilize Windows XP embedded architecture or any other similar architecture. The RFID firmware controls the reading and writing of the RFID tag 28. The firmware of the I/O control interface 44 controls the dispensing port 18 of the dispensing head 16 based on the input event. The container-handling logic software controls the handing and interaction of the container 26, which includes what beverage to dispense, how much amount to dispense, which parameters to record with respect to the container 26, and how to record those parameters. The container-handling logic keeps a log of the inventory of all the containers 26 and their associated data. The tag criteria logic divides the RFID tag 28 into specific segments to collect data, interpret data, process data and write new data to the RFID tag 28. The user interface system manages the interaction of the beverage dispensing system 2 with the customers. It allows the beverage dispensing system 2 to be modified for different drinks, videos, commercials, loyalty programs and specific program requirements. The container-handling logic, the tag criteria logic and the user interface software reside on the hard drive of the CPU 52 in the processing system 50. Additionally, software packages for web interface for the customer, kiosk and point-of-sale (POS) may be incorporated.

A customer purchases a container 26, with a preprogrammed number of fills and later on the refills (for a refillable container), as per his/her requirement, from a cashier, a kiosk or the like. A point of sale (POS) functionality may be provided by coupling a debit/credit card reader to beverage dispensing system 2, to enable customers to purchase beverages at the beverage dispensing system 2, by operating a user interface. Any card having a magnetic strip containing information, like the credit card, debit card, access card, key card or other similar devices may be used. Additionally, the customer may also be able to access the user interface via a hardwired network and an IP addressable access point to the internet. Network cables may be connected to the beverage dispensing system 2 to allow remote access. Thus, the customer may be able to purchase refills by accessing the user interface via a web. Once the container 26 integrated with the RFID tag 70 is purchased, the customer approaches the beverage dispensing system 2 to fill the container 26 with the desired beverage. The system may be completely software driven so that the promotions are endless. For example, to increase more frequent visits at a store with a cup refill program, the customers may be awarded with points for using their containers at the store chain. The more times customers pour at a certain store chain, the more reward points they receive. Another example is that a customer can be given 5 free ups for every 10 purchased.

Figure 11:
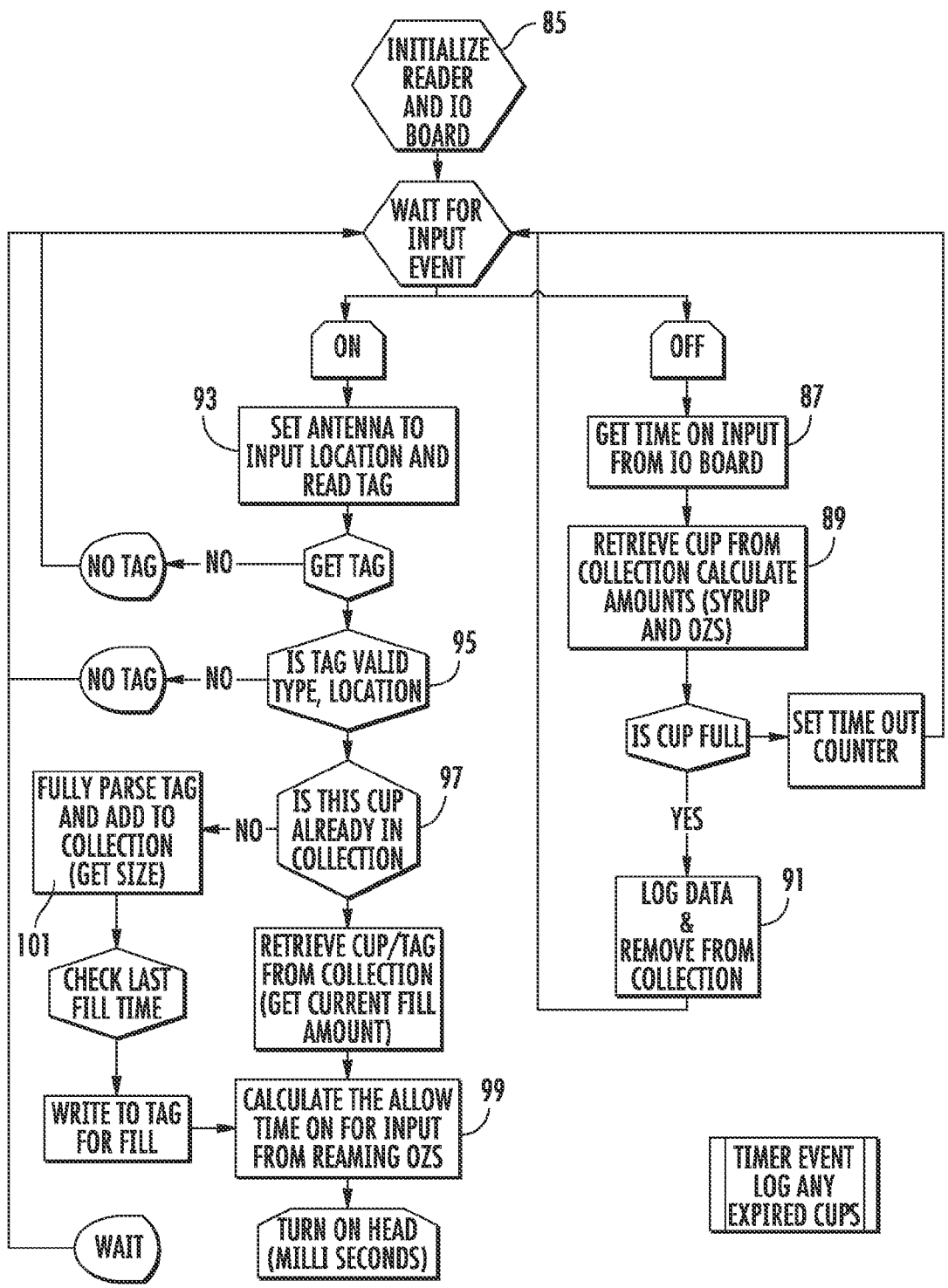
FIG. 11 is a flow chart representing container-handling logic.

FIG. 11 shows a flow chart representing the container-handling logic. As indicated in the initial step of block 85, when power is provided to the beverage dispensing system 2, the beverage dispensing system 2 boots up and is initialized for receiving the input. Once initialized, the beverage dispensing system 2 awaits for any input event; the input event being pressing of any dispensing switch 22 by a customer.

When an event input is observed, such as when the dispensing switch 22 is pressed by a customer, the corresponding antenna 35 is activated to read the associated RFID tag 28, as indicated in block 93. If no RFID tag 28 is detected by the antenna 35, the beverage dispensing system 2 waits for an input event for a preset time. The beverage dispensing system 2 may also prompt the customer to try again via a message displayed on the display screen 20. If a RFID tag 28 is detected by the antenna 35, the information associated with the RFID tag 28 is read, as indicated in block 95. This information includes all the data associated with the RFID tag 28, including type, location, validity, etc. The CPU 52 stores the data associated with the collection of containers 26, which are in the process of being filled. These are the containers, in effect, RFID tags 28, which have not completed their fill and are still within their allotted time frame, which is typically 70 seconds. It is then determined, as indicated in block 97, whether the container 26 is present in the existing collection of the CPU 52 i.e., the RFID tag 28 is in the process of being filled and still has available ounces to dispense. If the container 26 is present in the existing collection of the CPU 52 but is out of refills, the beverage dispensing system 2 may prompt the customer via a message on the display screen 20 to purchase more refills.

If the container 26 is found to be present in the existing collection of the CPU 52 and is allowed to fills, the corresponding information is retrieved and the remaining on-time amount is calculated, as indicated in block 99. The corresponding dispensing port 18 of the dispensing head 16 is then turned on by the I/O control interface 44 for the calculated on-time and the desired beverage is dispensed into the container 26. The CPU 52 continues to count the ounces dispensed until the designated maximum capacity (beverage and ice) of the container 26 has been poured; therefore, a customer will have the ability to switch the type of beverage being dispensed before the maximum amount has been dispensed. A message may also be displayed on the display screen 20 letting the customer know how many refills remain on his/her containers 26. The customer may also have the ice dispensed into the container 26, by pressing the dispensing switch 22 of the central dispensing head 16, which dispenses the ice. It is to be understood that the dispensing of the beverage and the ice can be done in any order. If the container 26 is not present in the existing collection in the CPU 52, it is added to the existing collection along with the associated data that is read from the RFID tag 28, as indicated in block 101. The RFID tag 28 is then written to, and the allowed on-time is calculated by the CPU 52, as indicated in block 99. The dispensing port 18 of the dispensing head 16 associated with the container 26 is then turned on by the I/O control interface 44 for the calculated on-time and the desired beverage is dispensed into the container 26.

When the user releases the dispensing switch 22, the CPU 52 obtains time-on data from the I/O control interface 44. The CPU then calculates the remaining amount of beverage (syrup and ounces) for the container 26, as indicated in block 89. As indicated in block 91, if no balance amount is available for the container 26, the corresponding data is logged and the container 26 is removed from the stored collection in the CPU 52. However, if balance amount is available for the container 26, the counter of the I/O control interface 44 is set to the available balance amount and the corresponding data is logged into the CPU 52.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It is to be realized that the optimum dimensional relationships for the parts of the invention to include variations in size, materials, shape, form, function and manner of operation, assembly and use, are deemed readily apparent and obvious to one skilled in the art.

For example, the beverage dispensing system may have any number of dispensing heads and each of the dispensing head may dispense any beverage. The beverage dispensing system, the grate assembly and the drip tray may have different configuration. Exemplary embodiments described provide for retrofitting of the common beverage dispensing systems to make them RFID-enabled. Retrofit may include application of the RFID reader unit anywhere on a standard beverage dispensing system. Additionally, the beverage dispensing system may be coupled to a food preparation area such that a customer can order food items without the need to approach a traditional cash register.

The systems illustrated herein can be readily implemented in hardware and software using any known or later developed systems, structures, devices and software from the functional description provided herein. The system of the above embodiments can be implemented with a special purpose computer, peripheral integrated circuit elements, a programmed microprocessor or microcontroller, other integrated circuits, a digital signal processor, a hard-wired electronic or logic circuits and the like. As such, any device capable of implementing the flowchart illustrated herein can be used to implement the beverage dispensing system according to the embodiments described.

The invention claimed is:

1. A beverage dispensing system, comprising:
   a dispensing port for use in dispensing a beverage therefrom;

a drip tray located below the dispensing port for use in collecting beverage dispensed from the dispensing port; and an antenna located below the dispensing port and located above the drip tray, wherein the antenna is configured to receive a signal from a radio frequency identification (RFID) tag, wherein the antenna is carried by a grate located on the drip tray.

2. The beverage dispensing system as set forth in claim 1, wherein the antenna is located between a lower half of the grate and an upper half of the grate, wherein the lower half of the grate and the upper half of the grate define a liquid tight seal to prevent beverage dispensed from the dispensing port from contacting the antenna, wherein the antenna is a loop antenna and has a metal ring, wherein an air space having a distance of at least 0.0625 inches is present between the metal ring of the antenna and the grate.

3. The beverage dispensing system as set forth in claim 1, further comprising a subminiature version A (SMA) cable attached to the antenna, wherein the antenna has a gamma match, and wherein the antenna is a loop antenna and is configured for operating in a magnetic field, wherein the attachment point of the SMA cable to the antenna is located at the center of the antenna.

4. A beverage dispensing system, comprising:
a dispensing port for use in dispensing a beverage therefrom;
an antenna located below the dispensing port, wherein the antenna is configured to receive a signal from a radio frequency identification (RFID) tag;
an antenna housing that surrounds the antenna, wherein the antenna housing prevents beverage dispensed from the dispensing port from contacting the antenna; and
a drip tray located below the dispensing port for use in collecting beverage dispensed from the dispensing port, wherein the drip tray has a bottom surface, and wherein the antenna is spaced from the bottom surface of the drip tray,
wherein the antenna housing extends upwards from the bottom surface of the drip tray, wherein the antenna is located within the drip tray, and wherein the bottom surface of the drip tray has a planar portion and defines a channel.

5. The beverage dispensing system as set forth in claim 4, further comprising a grate located between the antenna housing and the dispensing port, wherein the antenna housing has an outer upper surface that is contoured such that beverage striking the outer upper surface of the antenna housing flows off of the outer upper surface via gravity.

* * * * *